United States Patent
Ewert

(10) Patent No.: US 10,635,103 B2
(45) Date of Patent: Apr. 28, 2020

(54) DEVICE AND METHOD FOR CONTROLLING A VEHICLE

(71) Applicant: Robert Bosch GmbH, Stuttgart (DE)

(72) Inventor: Marlon Ramon Ewert, Untergruppenbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/943,805

(22) Filed: Apr. 3, 2018

(65) Prior Publication Data

US 2018/0299890 A1   Oct. 18, 2018

(30) Foreign Application Priority Data

Apr. 18, 2017  (DE) ........................ 10 2017 206 485

(51) Int. Cl.

| | |
|---|---|
| *G05D 1/00* | (2006.01) |
| *B60W 50/14* | (2020.01) |
| *B60W 40/09* | (2012.01) |
| *G06F 9/00* | (2006.01) |
| *B60W 40/08* | (2012.01) |
| *G06K 9/00* | (2006.01) |

(52) U.S. Cl.
CPC .......... *G05D 1/0061* (2013.01); *B60W 40/09* (2013.01); *B60W 50/14* (2013.01); *G05D 1/0088* (2013.01); *G06K 9/00845* (2013.01); *B60W 2040/0827* (2013.01); *G05D 2201/0213* (2013.01)

(58) Field of Classification Search
CPC ... B62B 5/0073; B62B 5/0036; B62B 5/0053; B62B 5/0069; B62B 5/0096; B62B 3/14; G01C 22/00; G01V 15/00; H02K 7/1846; H04W 4/025; B60L 7/10; B60L 2200/22; B60L 7/36

See application file for complete search history.

(56) References Cited

U.S. PATENT DOCUMENTS

| | | | | |
|---|---|---|---|---|
| 6,974,414 | B2 * | 12/2005 | Victor .................... | A61B 3/113 600/300 |
| 10,173,693 | B2 * | 1/2019 | Barke ................. | B60W 50/082 |
| 2014/0309893 | A1 * | 10/2014 | Ricci ....................... | H04W 4/21 701/49 |
| 2017/0110022 | A1 * | 4/2017 | Gulash ................... | G09B 9/052 |

FOREIGN PATENT DOCUMENTS

| | | |
|---|---|---|
| DE | 102007046037 B3 | 4/2009 |
| DE | 102009016936 A1 | 11/2009 |
| DE | 102014006261 A1 | 9/2014 |

(Continued)

*Primary Examiner* — Anthony R Jimenez
(74) *Attorney, Agent, or Firm* — Norton Rose Fulbright US LLP; Gerard Messina

(57) ABSTRACT

A device and to a method for controlling a vehicle, the vehicle being capable of being operated in a first operating state in which the vehicle is controlled by the driver with regard to its movement, and being capable of being operated in a second operating state in which the vehicle is guided autonomously or at least in highly automated fashion without intervention by the driver with regard to its movement, a driver observation device being provided that detects the ability of the driver to drive, and, when inability of the driver to drive is recognized, automatically changes over the vehicle controlling from the first operating state to the second operating state.

9 Claims, 1 Drawing Sheet

(56) References Cited

FOREIGN PATENT DOCUMENTS

| | | |
|---|---|---|
| DE | 102014007341 A1 | 11/2014 |
| DE | 102013009423 A1 | 12/2014 |
| DE | 102015003348 A1 | 9/2016 |
| DE | 102015205135 A1 | 9/2016 |
| WO | 2006127281 A1 | 11/2006 |

* cited by examiner

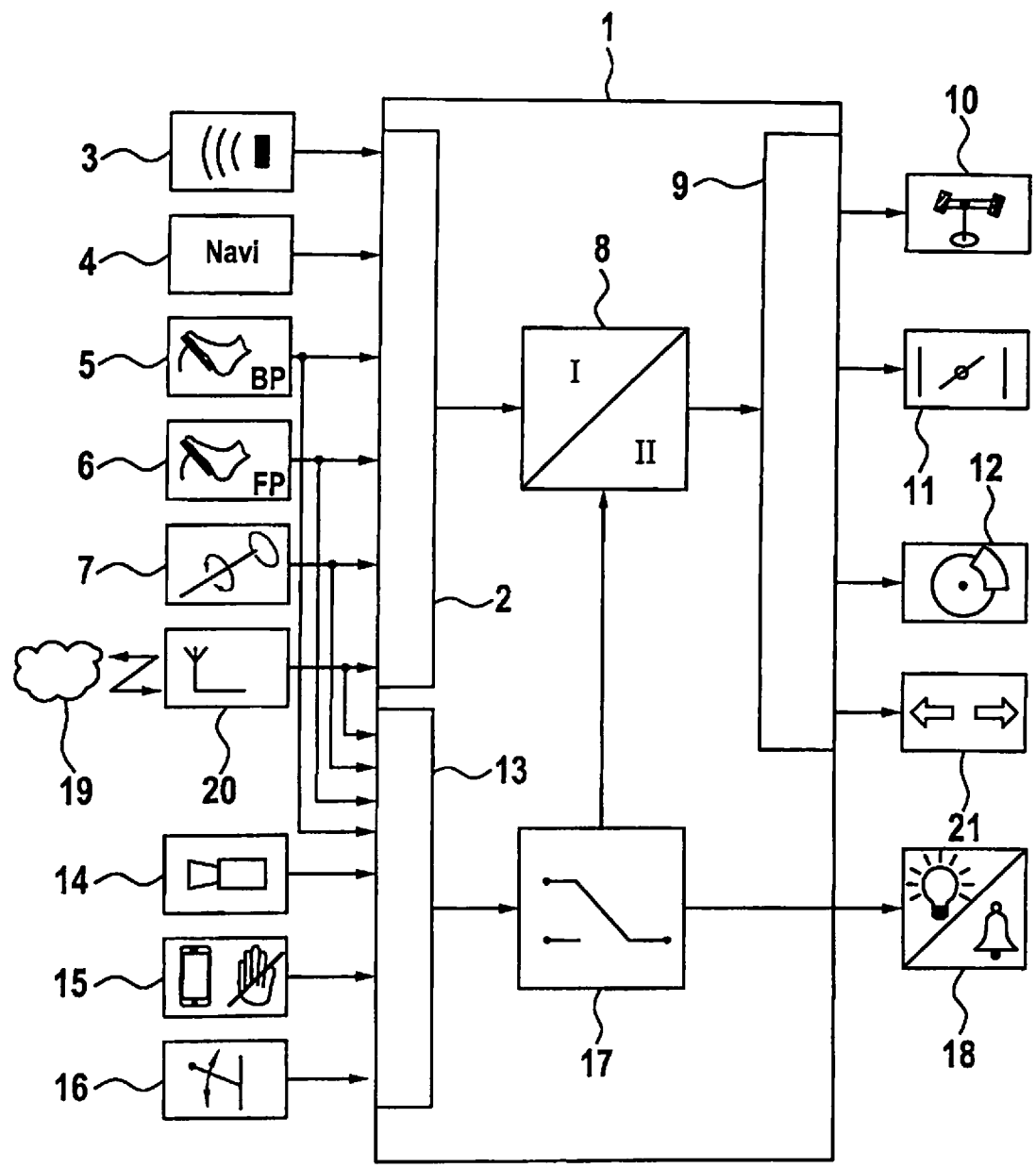

DEVICE AND METHOD FOR CONTROLLING A VEHICLE

CROSS REFERENCE

The present application claims the benefit under 35 U.S.C. § 119 of German Patent Application No. DE 102017206485.4 filed on Apr. 18, 2017, which is expressly incorporated herein in its entirety.

The present invention relates to a device and to a method for controlling a vehicle, the vehicle being capable of being operated in a first operating state in which the vehicle is controlled by the driver with regard to its movement, and being capable of being operated in a second operating state in which the vehicle is guided autonomously or at least in highly automated fashion without intervention by the driver with regard to its movement, a driver observation device being provided that detects the ability of the driver to drive, and, if an inability of the driver to drive is recognized, changes the vehicle controlling over automatically from the first operating state to the second operating state.

BACKGROUND INFORMATION

German Patent Application No. DE 10 2014 007 341 A1 describes a method for operating a vehicle in which, on the basis of acquired signals, tiredness or inattentiveness of a driver of the vehicle is ascertained and, as a function of a degree of severity of the ascertained tiredness and/or inattentiveness, at least one warning signal is issued to the driver. According to the present invention, in addition to the issuing of the warning signal, a number of driver assistance systems of the vehicle, supporting at least one driving operating mode, are activated automatically until a pause is taken.

SUMMARY

In accordance with the present invention, a driver is acquired using a driver observation device, and, in a vehicle driving in a highly automated mode, or in an autonomously driving vehicle, to automatically activate the existing auxiliary devices if, due to inability to drive or distraction, the driver is not himself/herself capable of fully performing the task of driving.

Advantageous developments and embodiments of the present invention are described herein.

In the context of the present invention, the concept of the vehicle driving in highly automated fashion is used for vehicle states in which the vehicle is automatically guided through the driving events at least for some stretches without an intervention by the driver, but the driver has to take over the task of driving in extraordinary driving situations in which the vehicle can no longer perform its highly automated driving function. Here, in the context of the present invention the concept of the autonomously driving vehicle is provided for vehicles in which the vehicle can itself handle even complex driving situations, and interaction or monitoring by the driver is no longer necessary.

In the case in which, during highly automated driving, the driver has to take over the task of driving in order to manually further drive the vehicle, this can take place for example via a certain notification time between the informing of the driver and the changeover.

Advantageously, the device is developed in such a way that in the second operating state the vehicle controls actuator devices for controlling the movement of the vehicle in the vehicle longitudinal direction and/or actuator devices for controlling the movement of the vehicle in the transverse direction and/or controls signal devices of the vehicle. Through the actuator devices for controlling the movement in the vehicle longitudinal direction, it is possible to automatically accelerate or decelerate the vehicle in the autonomous operating state or in the highly automated operating state, and thus to guide the vehicle without driver interaction along a driving trajectory calculated in advance. Through the provision of actuator devices for controlling the movement of the vehicle in the transverse direction, it is possible to modify the direction of travel of the vehicle through steering interventions without interventions by the driver, in such a way that the vehicle is controlled in highly automated fashion or autonomously along a driving trajectory calculated in advance. Through the provision of signal devices on the vehicle, it is further possible for changes in direction of travel, or driving situations in which following traffic should be warned by blinking warning devices, to be signaled automatically, and thus for the autonomously driving vehicle or the highly automated driving vehicle to inform its surrounding environment of impending driving maneuvers.

In addition, it is advantageous if the driver observation device is an interior camera that recognizes tiredness of the driver. It is possible to use cameras or high-resolution sensors in the interior of the vehicle to recognize the driver and his/her facial activity and expressions, and to evaluate particular movement patterns in order to find out whether the driver is attentive, or capable of driving, for the current driving task, or whether driver attentiveness or ability to drive is absent, so that further actions become necessary. For this purpose, it can be provided that a camera or a high-resolution radar or lidar sensor acquires at least the head region of the driver of the vehicle, acquiring the strength and/or the frequency of eye blinking, yawning of the driver, or the frequency of yawning within a specified time period, or the duration of closed eyelids of the driver, and from one or more of these values determines a state of tiredness of the driver, by whose value a changeover of the vehicle controlling from the first operating state to the second operating state is triggered.

In addition, it is advantageous if the driver observation device is a hands-free device or a mobile radiotelephone device coupled to the vehicle, through which an incoming or outgoing call, or an activity of the driver operating the mobile radiotelephone device or the hands-free device or an entertainment device, is recognized. In this way, it is possible for a telephone activity of the driver or an Internet activity of the driver to be acquired, and thus for a degree of distractedness of the driver from the current driving situation to be determined, as a function of which a changeover of the controlling of the vehicle from the first operating state to the second operating state can be enabled.

In addition, it is advantageous if the driver observation device is a measurement value sensor that acquires an actuation of the steering wheel and/or an actuation of the accelerator pedal and/or an actuation of the brake pedal, and through evaluation of the deflection amplitude, the deflection speed, and/or the frequency of actuation of the driver observation device it is determined whether the driver is attentively following driving events or is inattentive. Through evaluation of the actuation amplitudes, the actuation speeds, and/or the actuation frequencies of the driver actuation devices such as the accelerator pedal, brake pedal, and/or steering device, the current degree of driver attentiveness can be derived and correspondingly the first operating state of the vehicle controlling can be maintained, or, in the case of inattentiveness of the driver, a changeover can be made to the second operating state in order to further drive the vehicle in a highly automated or autonomous operating mode in order to increase driving safety.

In addition, it is advantageous if the driver observation device is a measurement value sensor that acquires the vehicle longitudinal speed and/or the vehicle transverse speed and/or the vehicle longitudinal acceleration and/or the vehicle transverse acceleration and/or the rate of rotation about the vehicle yaw axis, i.e., the vehicle vertical axis, and/or the rate of rotation about the vehicle roll axis, i.e., the vehicle longitudinal axis, and/or the rate of rotation about the vehicle pitch axis, i.e., the vehicle transverse axis, and/or that detects objects in the surrounding environment of the vehicle and provides coordinates of the object relative to the home vehicle. Through the detection of the vehicle longitudinal dynamic behavior, vehicle transverse dynamic behavior, and rotational rates, it is possible to ascertain the current manner of driving of the home vehicle and for example to recognize an unstable driving manner that would permit inference of unconsciousness of the driver. Such unstable driving can be recognized for example if the driver suffers a heart attack or if the driver is inattentive and is only sporadically correcting the vehicle in the lane. In addition, driver observation is also possible using external environmental sensors, in that object sensors such as radar sensors, lidar sensors, video sensors, and/or ultrasound sensors measure the relative positions of objects and ascertain their relative movement and/or the nearing of the home vehicle to these recognized objects, and evaluate these factors with regard to driver attentiveness. Through the evaluation of the positions and movements of the home vehicle relative to recognized objects, it is also possible to evaluate the home vehicle longitudinal dynamic behavior and/or vehicle transverse dynamic behavior without requiring for this purpose speed sensors, acceleration sensors, or rotational rate sensors in order to ascertain the movements of the home vehicle.

In addition, it is possible through a comparison of a target trajectory of the vehicle calculated ahead of time, calculated for example in the background by an artificial intelligence, with the actually traveled trajectory of the vehicle. If there are deviations between the target trajectory and the actual trajectory, which can occur for example via environmental sensors through evaluation of the distances and relative positions of objects, and of the comparison of the deviation values with a threshold value, it is possible to change over the driving state from the first operating state to a second operating state, and thus to automatically activate a highly automated or autonomous driving operating mode. The advantage in this embodiment is that only a small additional outlay is necessary, because target trajectories for the intervention have to be calculated ahead of time anyway in the background by the artificial intelligence. Here, the artificial intelligence can for example be realized by an artificial neural network.

In addition, it is advantageous that the driver observation device is situated outside the vehicle, in that an item of information about the ability of the driver to drive is stored in a data cloud to which the vehicle is connected, and for the changeover from the first to the second operating state the data cloud is queried as to whether this item of information representing the ability of the driver to drive is present or not. For example, the driver's physician can store an item of information in the data cloud. For example every time the vehicle is started, it accesses the data cloud using a car-to-X data connection, and queries this stored driver ability information. If the physician has stored information in this data cloud documenting a lack of ability of the driver to drive, for example due to severe illness, then an activation of the first operating state, or manual driving operation by the driver, is not possible; rather, only a highly automated or autonomous driving mode is possible. Only if the driver's physician has entered "healthy" as the state of health in the data cloud, i.e., has stored information stating that the ability to drive is present, or an end date of the sickness period has passed and the information relating to the inability of the driver to drive has been automatically deleted in the data cloud, can the vehicle again be operated by the driver in the first operating state, which represents manual vehicle operation. Through this development, it is ensured that drivers can manually operate a vehicle only if they are healthy enough to do so. If this ability to drive is not present, the driver can use the vehicle only in autonomous driving mode or in highly automated driving mode, thereby increasing driving safety.

In addition, it is advantageous that before the changeover from the first operating state to the second operating state, an optical and/or acoustic and/or haptic warning is issued to the driver by a warning device. This development has the advantage that the driver is informed about the time of the changeover before the changeover, and if necessary the driver can prevent the automatic changeover from the first operating state to the second operating state. This can be appropriate when the driver wishes to deliberately continue driving in the manual operating state, and for this purpose is again consciously devoting the required attention to the task of driving.

The method according to the present invention may be realized in the form of a control element that is provided for a control device of an autonomous driving function or highly automated driving function of a motor vehicle. Here, a program is stored on the control element that is capable of being executed on a computing device, in particular on a microprocessor or signal processor, and is suitable for carrying out the method according to the present invention. Thus, in this case the present invention is realized by a program stored on the control element, so that this control element, provided with the program, represents the present invention in the same way as does the method for whose execution the program is suitable. As control element, in particular an electrical storage medium may be used, such as a read-only memory.

Further features, possible applications, and advantages of the present invention result from the description of exemplary embodiments of the present invention shown in the FIGURE of the drawing. Here, all described or represented features, in themselves or in any combination, represent the subject matter of the present invention, independent of their formulation or representation in the description herein or in the FIGURE.

BRIEF DESCRIPTION OF THE DRAWING

In the following, an exemplary embodiment of the present invention is explained on the basis of the FIGURE.

The FIGURE shows a schematic diagram of the specific embodiment of the device according to the present invention with the method according to the present invention.

DETAILED DESCRIPTION OF EXAMPLE EMBODIMENTS

In the FIGURE, a vehicle control system 1 is shown that has an input circuit 2 for vehicle control quantities. In addition, vehicle control system 1 has a further input circuit 13 to which input signals are supplied for driving ability quantities. The input signals supplied to input circuit 2 for vehicle control quantities are signals as a function of which vehicle actuators are supplied for vehicle acceleration, vehicle deceleration, or vehicle steering. Input quantities supplied to input circuit 2 for vehicle control quantities may be output signals of an environmental sensor system 3. Here, environmental sensor system 3 can include ultrasound sensors, radar sensors, video sensors, lidar sensors, or a combination of these types of sensor. These sensors recognize objects in the region of detection of the respective sensor, and are capable of ascertaining the positions and, if warranted, speeds of the objects relative to the home vehicle. Here, advantageously the lists of positions of the detected objects are outputted by environmental sensor system 3 to input circuit 2 for vehicle control quantities, in order to further process them in vehicle control system 1. In addition, output signals of a device for digital map data 4 can be provided to input circuit 2 for vehicle control quantities.

Standardly, navigation devices have access to digital map data, which can be supplied for example to input circuit 2 for vehicle control quantities, in order to control actuator devices 10, 11, 12 and of signal devices 21 as a function of the navigation data, which for example can also contain the course of the street being traveled. As further input signals, output signals of a brake pedal sensor 5 can be provided to input circuit 2 for vehicle control quantities, and here the actuation speed, actuation amplitude, and possibly the actuation frequency of the brake pedal by the driver can be ascertained and can be outputted to input circuit 2 for vehicle control quantities. If vehicle control system 1 is operated in the first operating state, i.e., in manual operating mode, then deceleration devices 12 are controlled as a function of the brake pedal actuation acquired by brake pedal sensor 5, and the vehicle is braked. In addition, it is possible to control the actuator devices of deceleration devices 12 also as a function of recognized objects acquired by environmental sensor system 3, for example in order to reduce an acute danger of collision. In addition, it is also possible that, given a curvy roadway course, which can be recognized via digital map data 4 of the navigation device, control deceleration devices 12 are also controlled in order to reduce the current vehicle speed. As a further input quantity of input circuit 2 for vehicle control quantities, an accelerator pedal sensor 6 is provided that, similar to brake pedal sensor 5, acquires the deflection amplitude, the deflection speed, and, if necessary, the deflection frequency of the accelerator pedal through the driver's actuation, and supplies these to input circuit 2 for vehicle control quantities. As a function of these acquired accelerator pedal sensor actuations, it is possible, in the first operating state of vehicle control system 1, i.e., in manual operating mode, to control acceleration devices 11 in order to correspondingly accelerate the vehicle. Acceleration devices 11 may include for example an electronically controlled throttle valve, a fuel quantity metering device of a fuel injection system, or a power transistor of an electric drive. In addition, an output signal of a steering angle sensor 7 is supplied to input circuit 2 for vehicle control quantities, this steering angle sensor 7 acquiring the driver actuation of the steering wheel and providing quantities such as the deflection amplitude of the steering wheel, the direction of deflection, the speed of deflection, and possibly the steering frequency, to vehicle control system 1. If vehicle control system 1 is operated in the first operating state, i.e., in manual operating mode, then actuator device 10 for steering devices can be controlled on the basis of the steering signals provided by steering angle sensor 7. Here, depending on the deflection and speed of deflection, steering device 10 can be controlled with different strengths, or also with different speeds, in order to correspondingly set the steering angle of the vehicle. In addition, as input quantity, a C2X interface (car-to-X interface) is provided to input circuit 2 for vehicle control quantities, which interface can be realized by a receive antenna 20. Via this receive antenna 20, the vehicle can receive data from a data cloud 19, and for example can be provided with highly precise, dynamic map data or movement data of other traffic participants in the immediate surrounding environment of the vehicle. From the input quantities supplied to input circuit 2 for vehicle control quantities, it is possible, through control device 8, in a first operating mode, which can also be designated manual operating mode, to provide output signals for an output circuit 9 for vehicle control quantities. Here, the input quantities are outputted to downstream actuator devices 10, 11, 12 and to signal devices 21, a steering actuation of the driver at steering angle sensor 7 being outputted to steering devices 10, an accelerator pedal actuation acquired by accelerator pedal sensor 6 being outputted to the actuator device of acceleration devices 11, and a brake pedal actuation acquired by brake pedal sensor 5 being outputted to the actuator device for deceleration devices 12. Further safety functions, such as an automatic emergency brake function or an automatic adaptation of the vehicle longitudinal speed, can additionally be superposed on these manual vehicle operations. In addition, vehicle steering unit 1 has a further input circuit 13 for driving ability quantities, to which for example the output quantities of brake pedal sensor 5, accelerator pedal sensor 6, steering angle sensor 7, and car-to-X interface 20 are provided. In addition, this input circuit 13 for driving ability quantities can be supplied with output signals of an interior camera 14 or a high-resolution radar or lidar sensor, which recognizes and evaluates the attentiveness of the driver and can thus determine whether the driver is currently following driving events attentively or is distracted from driving events. In addition, from the signals of brake pedal sensor 5, accelerator pedal sensor 6, and steering angle sensor 7, the driver actuation can be determined, and the attentiveness of the driver can be ascertained from the frequency and intensity of these quantities. If the driver is fatigued, or is distracted by other activities such as telephoning or operating entertainment devices, the driver's actuation of this steering angle sensor 7, brake pedal sensor 5, and accelerator pedal sensor 6 changes, so that these sensor devices are less frequently actuated, but are then actuated more strongly and more hectically. The degree of driver attentiveness can be derived from this, as well as from interior camera 14, or high-resolution interior sensor 14. In addition, a signal of a hands-free device 15 or a coupled smart phone 15 is supplied to input circuit 13 for driver ability quantities, whereby it can be ascertained whether the driver is distracted from driving events due to operation of a mobile phone, for example by telephoning or Internet activities, so that an inability to drive may be present. In addition, an operating device 16 is provided as input quantity to input circuit 13 for driving ability quantities, which device can be for example actuating buttons or rotary dials or touchscreens for actuating vehicle functions. If the driver is currently occupied with the actuation of vehicle functions, for example changing the climate control settings, this may also indicate distraction of the driver from driving events, and may thus produce a lack of ability to drive at that moment. In addition, it is possible to provide information relating to the state of health of the driver to input circuit 13 for driving ability quantities. Thus, for example if the driver is seriously ill the driver's physician can store information in a data cloud 19. When the vehicle is started by the driver, then, for example via a car-to-X interface 20, information is queried from data cloud 19 and it is recognized that for the duration of the serious illness of the driver the vehicle can be operated only in second operating state II, in the autonomous driving state or highly automated driving state. Only when the driver's physician has deleted the illness information in data cloud 19, or a time-limited item of illness information has expired, can the driver again manually operate the vehicle in first operating state I. In this way, it is ensured that a driver who is seriously ill will not himself/herself drive the vehicle, thus endangering himself/herself and other traffic participants due to his/her state of health.

The quantities supplied to input circuit 13 for driver ability quantities are supplied to a driving ability determining device 17 in which a degree of distraction, and thus inability of the driver to drive, is ascertained on the basis of the actuation intensities and frequencies of actuation, and is compared to threshold values for the respective input quantity. If the specified threshold value is exceeded, because a particularly high degree of driver distraction from traffic events was recognized, so that an inability to drive was ascertained by driver ability determining device 17, then driver ability determining device 17 produces an output signal that is outputted to control device 8. In this case, control device 8 changes over from the first operating state to a second operating state, in that the vehicle is further guided autonomously or in highly automated fashion. In this second operating state, the vehicle is guided along a provided driving path through acceleration, deceleration, and steering, without the driver specifying control commands for this purpose through actuation of the brake pedal, the accelerator pedal, or the steering device. In this second operating state, the vehicle is accordingly guided, along a driving trajectory calculated ahead of time, mainly on the basis of the output signals from environmental sensor system 3, digital map data 4, and the input data of car-to-X interface 20. Before the changeover from the first to the second operating state is carried out in control device 8, it is possible for driving ability determining device 17 to activate a driver warning device 18 that can for example be an acoustic signal, an optical signal, or a haptic signal, or a combination of these. Through this signal of driver warning device 18, the driver is informed that a changeover from the first operating state to the second operating state is immediately impending, and that the driver may have to introduce countermeasures if he/she wishes to continue to operate the vehicle in the first operating state. If the driver does not carry out any countermeasures, then control device 8 changes over from the first, manual operating state to the second, automatically guided operating state, for example after the elapsing of a predetermined time period.

What is claimed is:

1. A device for controlling a vehicle, the vehicle being operatable in a first operating state in which the vehicle is controlled by a driver with regards to its movement, and is operatable in a second operating state in which the vehicle is guided autonomously or at least in an automated manner without intervention by the driver of the vehicle with regard to its movement, comprising:

a driver observation device to detect an ability of the driver to drive, and when an inability of the driver to drive is recognized, to automatically change over the controlling of the vehicle from the first operating state to the second operating state;

an input circuit for inputting vehicle control quantities, wherein inputs supplied to the input circuit for vehicle control quantities are a function of vehicle actuators for at least one of a vehicle acceleration, a vehicle deceleration, and/or a vehicle steering;

a further input circuit for inputting driving ability quantities, including output quantities of a brake pedal sensor, an accelerator pedal sensor, and a steering angle sensor, wherein through evaluation of one of a deflection amplitude, a deflection speed, and a frequency of actuation it is determined whether the driver is following driving events attentively or is inattentive;

wherein the driver observation device includes a measurement value sensor that acquires at least one of: (i) a vehicle longitudinal speed, (ii) a vehicle transverse speed, (iii) a vehicle longitudinal acceleration, and (iv) a vehicle transverse acceleration, (v) a rate of rotation about a vehicle yaw axis, (vi) a rate of rotation about a vehicle roll axis, (vii) a rate of rotation about a vehicle pitch axis, and (viii) detects objects in an environment surrounding the vehicle and provides relative coordinates of the objects.

2. The device of claim 1, wherein in the second operating state, the vehicle at least one of: (i) controls actuator devices for controlling of the movement of the vehicle in a vehicle longitudinal direction, (ii) controls actuator devices for controlling of the movement of the vehicle in a transverse direction, and (iii) controls signal devices of the vehicle.

3. The device of claim 1, wherein the driver observation device includes an interior camera that recognizes a tiredness of the driver.

4. The device of claim 1, wherein the driver observation device is one of: (i) a hands-free device, or (ii) a mobile radiotelephone device coupled to the vehicle, by which an incoming or outgoing call or an operating activity of the driver is recognized.

5. The device of claim 1, wherein the driver observation device is situated outside the vehicle, in that an item of information concerning the ability of the driver to drive is stored in a data cloud to which the vehicle is connected.

6. The device of claim 1, wherein before the changeover from the first operating state to the second operating state, at least one of an optical, an acoustic, and a haptic driver warning is issued to the driver by a warning device.

7. A method for controlling a vehicle, a control system of the vehicle operating the vehicle in a first operating state in which the vehicle is controlled by a driver of the vehicle with regard to its movement, and the control system operating the vehicle in a second operating state in which the vehicle is guided autonomously or at least in an automated manner without intervention by the driver with regard to its movement, the method comprising:

detecting, by a driver observation device, an ability of the driver to drive the vehicle; and automatically changing over the controlling of the vehicle from the first operating state to the second operating state when inability of the driver to drive is recognized;

inputting, via an input circuit, vehicle control quantities, wherein inputs supplied to the input circuit for vehicle control quantities are a function of vehicle actuators for at least one of a vehicle acceleration, a vehicle deceleration, and/or a vehicle steering; and inputting, via a further input circuit, driving ability quantities, including output quantities of a brake pedal sensor, an accelerator pedal sensor, and a steering angle sensor, wherein through evaluation of one of a deflection amplitude, a deflection speed, and a frequency of actuation it is determined whether the driver is following driving events attentively or is inattentive;

wherein the driver observation device includes a measurement value sensor that acquires at least one of: (i) a vehicle longitudinal speed, (ii) a vehicle transverse speed, (iii) a vehicle longitudinal acceleration, and (iv) a vehicle transverse acceleration, (v) a rate of rotation about a vehicle yaw axis, (vi) a rate of rotation about a vehicle roll axis, (vii) a rate of rotation about a vehicle pitch axis, and (viii) detects objects in an environment surrounding the vehicle and provides relative coordinates of the objects.

8. The method as recited in claim 7, further comprising:
issuing, before the changeover from the first operating state to the second operating state, to the driver at least one of an optical driver warning, an acoustic driver warning, and a haptic driver warning.

9. A non-transitory computer-readable medium on which is stored a computer program, which is executable by a processor, comprising:
program code for controlling a vehicle, a control system of the vehicle operating the vehicle in a first operating state in which the vehicle is controlled by a driver of the vehicle with regard to its movement, and the control system operating the vehicle in a second operating state in which the vehicle is guided autonomously or at least in an automated manner without intervention by the driver as to its movement, by performing the following:
detecting, by a driver observation device, an ability of the driver to drive; and
automatically changing over the controlling of the vehicle from the first operating state to the second operating state when inability of the driver to drive is recognized;
inputting, via an input circuit, vehicle control quantities, wherein inputs supplied to the input circuit for vehicle control quantities are a function of vehicle actuators for at least one of a vehicle acceleration, a vehicle deceleration, and/or a vehicle steering; and
inputting, via a further input circuit, driving ability quantities, including output quantities of a brake pedal sensor, and accelerator pedal sensor, and/or a steering angle sensor, wherein through evaluation of one of a deflection amplitude, a deflection speed, and a frequency of actuation it is determined whether the driver is following driving events attentively or is inattentive;
wherein the driver observation device includes a measurement value sensor that acquires at least one of: (i) a vehicle longitudinal speed, (ii) a vehicle transverse speed, (iii) a vehicle longitudinal acceleration, and (iv) a vehicle transverse acceleration, (v) a rate of rotation about a vehicle yaw axis, (vi) a rate of rotation about a vehicle roll axis, (vii) a rate of rotation about a vehicle pitch axis, and (viii) detects objects in an environment surrounding the vehicle and provides relative coordinates of the objects.

* * * * *